June 11, 1957  A. W. EDWARDS  2,795,671
CIRCUIT BREAKERS
Filed July 17, 1952  2 Sheets-Sheet 1
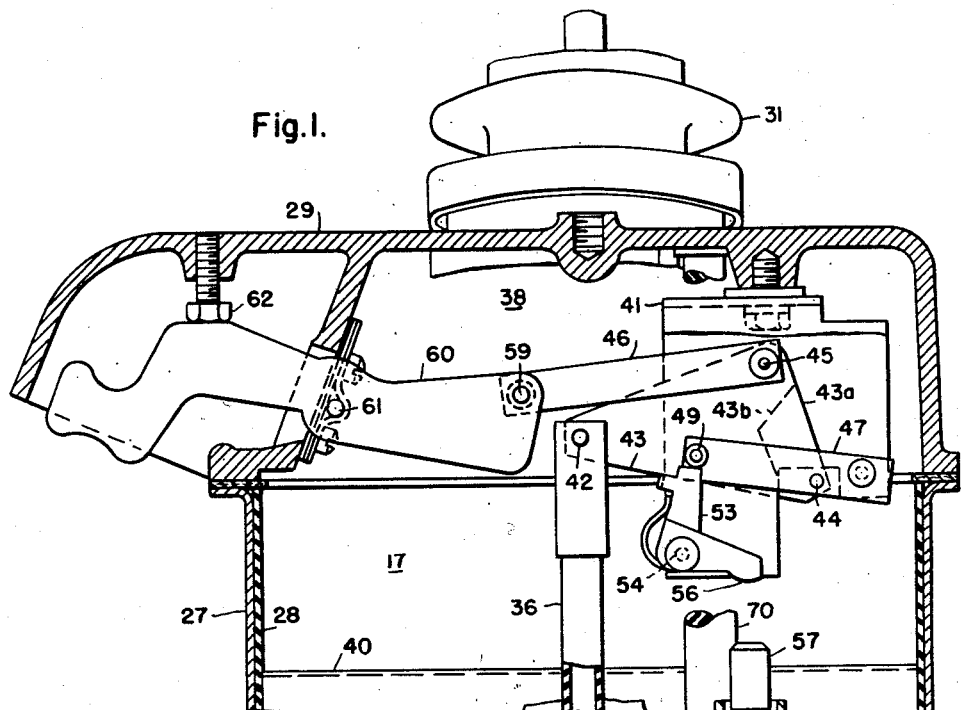
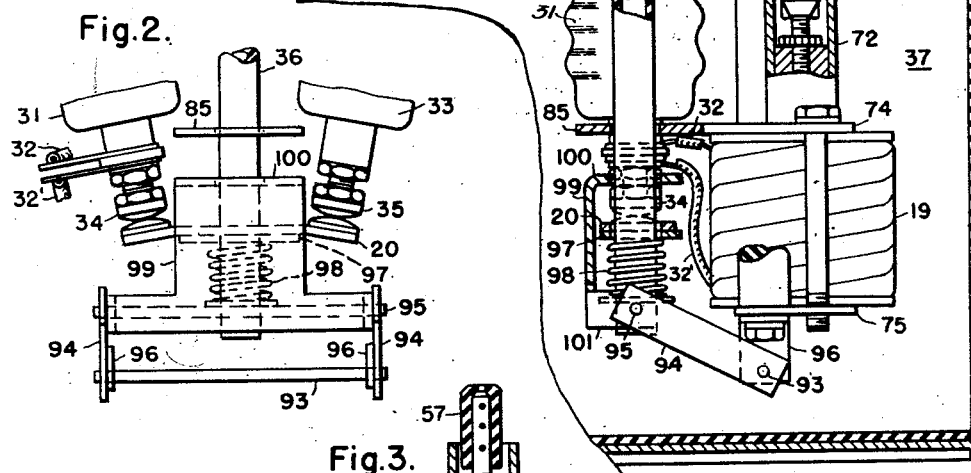
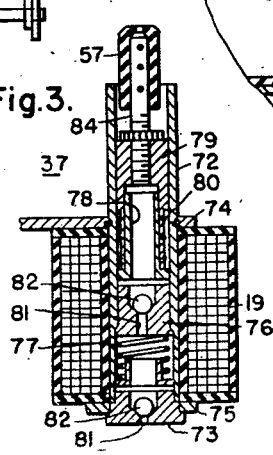
WITNESSES:
INVENTOR
Andrew W. Edwards.
BY
ATTORNEY June 11, 1957  A. W. EDWARDS  2,795,671
CIRCUIT BREAKERS
Filed July 17, 1952  2 Sheets-Sheet 2
Fig. 4.
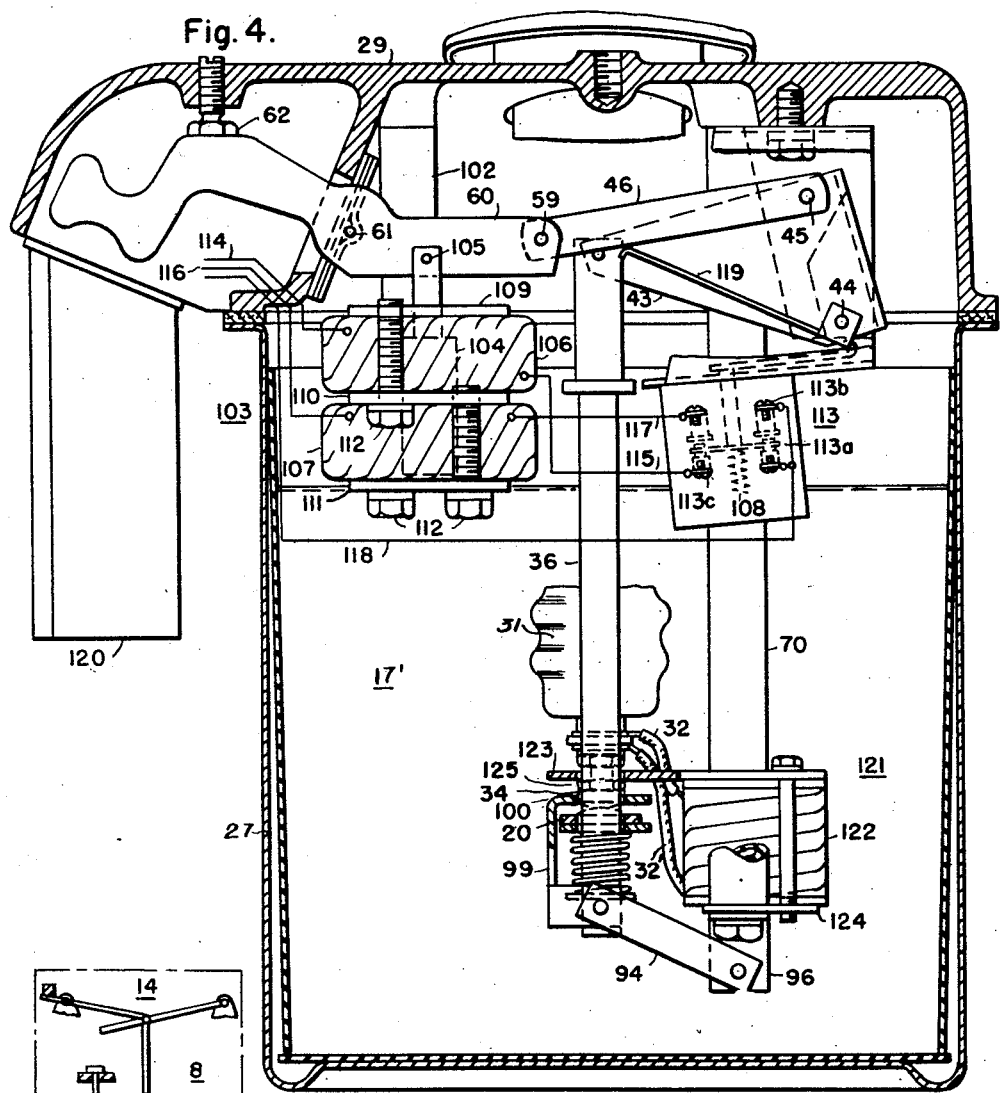
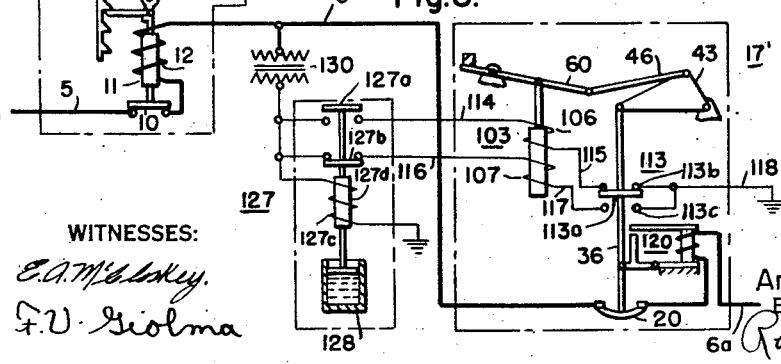
Fig. 5.
WITNESSES:
E. A. McCloskey.
F. V. Giolma
INVENTOR
Andrew W. Edwards.
BY Ralph H. Swingle
ATTORNEY

United States Patent Office 2,795,671
Patented June 11, 1957

2,795,671

CIRCUIT BREAKERS

Andrew W. Edwards, East McKeesport, Pa., assignor to Westinghouse Electric Corporation, East Pittsburgh, Pa., a corporation of Pennsylvania Application July 17, 1952, Serial No. 299,483

8 Claims. (Cl. 200—89)

My invention relates generally to circuit interrupters, and it has reference, in particular, to circuit interrupters of the type which may occasionally be disposed to interrupt fault currents, and to control circuits therefor.

In distribution circuits, particularly in rural districts, loss of diversity of load following an outage often makes it difficult to restore service. Following an outage of any appreciable duration, many automatic load devices, such as refrigerators, pumps, fans, blowers, etc., which are normally connected to the circuit only at random intervals, will often be all connected to the circuit awaiting its reenergization. As the loss of diversity usually grows with the duration of the outage, there will of necessity be a relatively high load on the circuit following such an outage, and the inrush current may well be so great as to cause operation of the circuit protective device to deenergize the circuit. This is not in the interests of continuity of service, and sectionalizing of the circuit to break the load up into two or more sections which may be sequentially reenergized to minimize the inrush current, is highly desirable.

Accordingly, it is an object of my invention to provide a novel atuomatic load sectionalizing switch.

Another object of my invention is to provide for operating a switch device in a new and novel manner to effect automatic sectionalizing of a distribution circuit and facilitate load pickup after an outage.

It is an important object of my invention to provide for increasing the contact pressure of a circuit interrupter under overcurrent conditions, and prevent separation of the contacts thereof when the current is above a value which may be safely interrupted.

It is also an important object of my invention to provide for using a magnetic flux produced by an overcurrent through a switch device for preventing operation of the operating mechanism of the switch device to open the switch device.

A further object of my invention is to provide for normally opening a switch device following reenergization of the circuit after an outage, and for preventing such normal opening operation in the event that there is a fault current in excess of a value which may be safely interrupted by the switch device.

It is also an object of my invention to prevent opening of a switch device during an excessive fault current, regardless of whether the opening atempted is manual or automatic.

Yet another object of my invention is to provide in a switch device, a magnetic circuit between a stationary pole piece and a pole piece associated with a movable contact member, for a magnetic flux produced by the current through the switch device, for preventing opening movement of the movable contact during an excessive overcurrent.

I also propose to utilize the counter-operating coil of a sectionalizing switch to produce magnetic flux for biasing the switch contacts closed, so as to prevent opening the contacts during dangerously high overcurrent.

With the foregoing and other objects in view, my invention consists in the systems, combinations, structures, parts, and methods of design and operation, hereinafter described and illustrated in the accompanying drawings, wherein:

Figure 1 is a simplified vertical cross-sectional view of a sectionalizing switch illustrative of my invention;

Fig. 2 is a vertical cross-sectional view of the contact structure taken at substantially right angles to the section of Fig. 1;

Fig. 3 is a vertical section in part of the counter shown in Fig. 1;

Fig. 4 is a vertical cross-sectional view corresponding to the view of Fig. 1, through a sectionalizing switch device, illustrating another embodiment of the invention; and Fig. 5 is a schematic diagram of a distribution system utilizing the invention in the form illustrated in Fig. 4.

Referring to Figs. 1 and 2, it will be seen that my invention may be embodied in a sectionalizing switch or sectionalizer generally of the type disclosed in copending applications Serial No. 196,508, of James M. Wallace and Andrew W. Edwards, filed November 18, 1950, and entitled Circuit Interrupter, now Patent No. 2,757,321, and Serial No. 187,566 of Andrew W. Edwards and Alvin W. Ogg, filed September 29, 1950, and entitled Electrically Operated Switches and Sectionalizers, now abandoned, respectively, both of which are assigned to the assignee of the present invention, and wherein a switch 17 is enclosed within a metal tank 27, which is provided with an insulating liner 28 and which is surmounted by a top casting 29. An incoming line enters through a bushing 31 which terminates inside the tank. The circuit then continues, through a conductor 32, the operating coil 19 of a counter 37, and by way of conductor 32' through terminal contact 34 which constitutes one of the stationary contacts of the sectionalizer. The sectionalizer has two bushings 31 and 33', each with its lead passing through the bushing, and each bushing terminates at its bottom in one of the stationary contacts of the sectionalizer; but since Fig. 1 shows an approximate central section through the sectionalizer, the second stationary contact and bushing are not visible in Fig. 1, but they are indicated in Fig. 2 at 35 and 33, respectively. The contacts 34 and 35 may be connected by a movable contact 20, shown in Fig. 2 as a contact bar or bridge which presses up against the underside of the stationary contacts 34 and 35, in the closed position, and which is lowered by gravity (after the rod 36 is accelerated by a spring 98) to operate the sectionalizer, upon the release of a pull rod 36, which is shown in the form of an upwardly extending insulating tube and is provided with an operating mechanism 38.

The sectionalizer 17 can theoretically operate either in air, or in an insulating oil or other insulating fluid. It is sometimes desirable to have the contacts 34—20—35 also operating in oil. I have consequently illustrated the apparatus, by way of example, as having the contacts 34—20—35 immersed in oil 40 which is contained in the tank 27.

The operating mechanism 38 is mounted in a frame 41 which is bolted to the underside of the top casting 29. This operating mechanism 38 may be regarded as starting with the movable contact member 20 and including the upwardly extending insulating pull rod 36, the bottom end of which is connected to said movable contact member. Pivotally connected at 42 to the top of the pull rod 36 is one of the two terminal pivot points of a rocker member or lever 43, which is shown in its preferred form as a triangular plate having a channel-shaped section at one end with an end base portion 43a and a shortened rear leg portion 43b. The lever 43 may be disposed with its base line nearly horizontal with two terminal pivot points 42 and 44 disposed near the ends of said base line, and having an upwardly extending apex portion which carries an intermediate rocker point 45, which is pivotally connected to a first end of a normally nearly horizontal link 46, which will be subsequently described. The second terminal pivot point 44 of the rocker member 43 is supported by means of a lever 47 pivoted to the frame 41 and releasably supported by a bell-crank lever 53 which engages a roller 49 and has an abutment portion 56 disposed to be actuated by a trip pin 57 of the counter 37 to release lever 47.

The link 46, which is pivoted at one end 45 to the top of the triangular rocker member 43, has a second end which is pivoted at 59 to the inner end of an operating handle 60. An intermediate point of the operating handle 60 is secured to a stationary pivotal support 61, which is carried within the top casting 29. The outer end of the operating handle 60 projects through an opening in the casting and normally presses up against a stop screw 62 which is carried by the underside of a hood-like extension of the top plate of the top casting 29.

The lower end of the pull rod 36 may be aligned by means of guide links 94 which are of a magnetic material for a reason which will be explained, and are pivotally supported at one end by a pin 93 secured by means of brackets 96 also of a magnetic material secured to the lower ends of tubular insulators 70 which depend from the top casting 29. The other ends of the links may be connected to the lower end of the pull rod 36 by a pin 95.

In order to provide for increasing the pressure between the contact member 20 and the contacts 34 and 35, as disclosed in application Serial No. 187,566, an actuating member 97 comprising, for example, a bar of iron, steel, or other magnetic material, may be slidably disposed on the pull rod 36 beneath the contact member 20, which is also slidably disposed on the pull rod and biased upwardly by a spring 98. An L-shaped guide bracket 99 having an upper leg 100 with an opening to receive the pull rod, and ears 101 adjacent the lower ends of the vertical leg with openings to receive the pin 95, may be utilized to align the bridge contact member 20 and prevent it from turning on the pull rod 36. By making at least the leg 100 of a magnetic material, the current flow in the contact member 20 is utilized to produce an attractive force between the actuating member 97 and upper leg 100 to increase the contact pressure.

The counter 37 is suspended from the top of the top casting 29, by means of a plurality of depending insulating supports or tubes 70. The counter proper 37 may, as shown in Figs. 1 and 3, comprise a vertically disposed tube 72, which is preferably made of brass or other non-magnetizable metal. The lower end of the tube is substantially closed by a plug 73 of a magnetic material, while the top of the tube 72 is open. A series current coil 19 surrounds a portion of the tube 72, intermediate between its upper and lower ends. Immediately above and below the coil 19 are two magnetizable plates 74 and 75, respectively, both of which are perforated so as to surround the tube 72. The plates 74 and 75 serve as the two pole pieces of an electromagnetic circuit, the excitation of which is provided by the coil 19. The plate 75 may be extended so as to support the coil from insulating support 70.

Inside of the tube 72 is a magnetizable core or armature 76 which is normally spaced from plug 73 by a spring 77 and which is slidably movable, with a close fit of, say, perhaps 3 mils radial clearance, within said tube. The armature 76 extends partly above and partly below the level of the upper plate 74, while the plug 73 extends partly above and partly below the lower plate 75. Each of the armature 76 and plug 73 thus extends partly within and partly without the space between the two plates 74 and 75.

The armature 76 has an upwardly extending tubular extension 78 upon which is slidably disposed a tubular cap 79 closed at the upper end. The cap 79 is of a nonmagnetic material and is provided with a plurality of annular magnetizable rings or ribs 80, which are vertically spaced from each other by a spacing which is preferably approximately the same distance as the closable distance between the armature 76 and plug 73, or other disposition which will magnetically lock the armature against unwanted vertical displacement or slippage. The compression spring 77 is disposed between the armature and plug, so that when the coil 19 is sufficiently energized, the armature is brought toward the plug, storing up energy in the interposed compression spring 77, as will be more fully described hereafter.

Each of the armature 76 and plug 73 is provided with a central bore 81, and each of these bores is closable by means of a ball valve 82, so that the fluid which is entrapped within the closed lower end of the tube 72 resists any rapid downward movement of the cap 79 on the extension of the armature, because of the closure of these ball valves 82, while said valves permit the free upward movement of the cap and armature. The entrapped fluid could be any gas or liquid having the required viscosity in comparison with the mechanical clearances which are provided. The idea is to permit the armature cap to move freely upwardly, in a step-by-step motion, as will be subsequently described, while permitting said armature cap to drift back downwardly again by fluid-leakage at a very slow rate.

At the top of the cap 79 of the armature 76 is affixed an upstanding pin 84, which extends upwardly to a point above the open top end of the tube 72. This pin 84 is surmounted by a tubular tip or trip pin 57, which is capable of serving as an adjustable vertical extension of the pin 84. This vertical adjustment is effected in any one of a plurality of vertically spaced positions corresponding to the spacing between the armature 76 and plug 73, by means of a cotter-pin (not shown), so that adjustment may be made for any desired number of "counts," such as 1, 2, 3, or 4, within the range of the counting mechanism 37.

In the operation of the counting mechanism 37, when the coil 19 is first energized with a current corresponding to the setting of the counter, the armature 76 is drawn downwardly so as to close the air gap which separates the inner ends of said armature and plug 73. The cap 79 of armature 76 will not move downwardly as the armature moves toward the plug, because of the presence of fluid flow valve 82 in plug 73, which prevents downward flow of fluid out of the tube 72. Hence, the armature 76 will move downwardly, while the cap 79 remains stationary, retained in part by the magnetic attraction of plate 74 for the nearest ring 80.

When there is a fault on a distribution line, within the protective reach of an automatic reclosing type of circuit breaker (not shown), the recloser quickly opens and quickly again recloses, but during the moment (12 cycles or more, in a 60-cycle line) when said recloser was open, the sectionalizer coil 19 is deenergized, and the compression spring 77 between the armature 76 and plug 73 expands and pushes the armature apart from the plug again, to obtain their normal separation distance. During this action, however, the armature cap 79 cannot remain stationary because of the upper fluid flow valve 82 closing, and, hence, the cap 79 must move upwardly with armature 76, which it is free to do, so far as fluid action is concerned, because valve 82 of plug 73 will open during such movement to permit upward flow of fluid into tube 72. The magnetic attraction between the upper plate 74 and the corresponding magnetizable ribs 80 of the cap on the armature 76 is now practically nonexistent, because of the deenergization of the coil 19, and hence the cap on the armature 76 is notched upwardly by a distance corresponding to the amount of compression of the spring 77.

If a fault continues on the distribution system at a point beyond the sectionalizer coil 19, the reclosure of the recloser reenergizes the sectionalizer coil 19 and causes a second compression of the spring 77 in a manner already described. If the fault is still on the system, as has just been assumed, the recloser again opens, and a second upward stepping movement of the trip pin 57 is obtained, and, thus, the step-by-step movement of the counter mechanism continues.

When the last upward stepping of the upper armature 76 is obtained, depending upon the vertical positioning of the trip pin or tubular tip 57, this pin 57 comes into contact with the abutment 56 of trigger 53 during this last upward movement, and trips out the sectionalizer by releasing lever 47 to drop the pivot pin 44 and effect counterclockwise rotation of the lever 43, thus dropping the pull rod and opening the sectionalizer contact 20. It will be noted that this last upward movement of the trip pin 57 occurs during a time when the current in the sectionalizer coil 19 is off. In the operation of the recloser the current remains off, that is, the recloser remains open for a minimum of 12 cycles (on a 60-cycle line) before the recloser recloses. The opening of the sectionalizer contact 20 requires something like 2 or 3 cycles, so that it is seen that the sectionalizer contact 20 normally opens during the current-off period, so that the sectionalizer contact 20 does not have to interrupt any substantial current. In opening, the lever 43 strikes reset pin 54 when the pull rod 36 drops and rotates counterclockwise about it to raise lever 47 and condition the switch for resetting by hand.

In order to prevent any possible separation of the contacts by either manual operation or otherwise, during an overcurrent of a value beyond that which the switch can safely interrupt, the upper magnetic plate 74 may be extended at one end, so as to have a portion 85 which is positioned immediately above the upper leg 100 of guide bracket 99. The spacing between these members may be such that the magnetic attraction between them resulting from the flux produced by coil 19 will be sufficient to prevent the bracket 99 and, hence, contact 20 from dropping, even if the operating mechanism be released during an overcurrent of such value that it cannot safely be interrupted. By making the links 94 and the bracket 99 of a magnetic material, a relatively low reluctance magnetic circuit is provided between the plates 75 and 74 through brackets 96, links 94, bracket 99 and portion 85 of plate 74, so that a high concentration of flux is effected across the gap therebetween to hold the bracket 99 and hence contact 20 in the position shown, and prevent separation of the contacts.

Referring to Fig. 4 of the drawing, it will be seen that to provide for electrically operating the switch 17' so as to use it, for example, for controlling the pickup of a load on a circuit following an outage in a power system, the counter 37 of Fig. 1 may be omitted, and electroresponsive operating means 103 may be provided. The electroresponsive means 103 may, as disclosed in the copending application Serial No. 187,566 of Andrew W. Edwards and Alvin W. Ogg, comprise an electromagnet having an armature 104 pivotally connected to the lever 60 by a pin 105, and upper and lower operating windings 106 and 107. These windings may be disposed between plates 109, 110 and 111 of a magnetic material such as iron or steel, which plates may be maintained in spaced relation by bolts 112 which magnetically link the plates. The operating means 103 may be supported by extending the lower plate 111 and securing it to an insulating support 102 depending from the casting 29. The armature 104 is so disposed that when the upper winding 106 is energized, the armature will be pulled upwardly by magnetic flux in the gap between the upper plate 109 and the armature. It will be pulled downwardly when the lower winding 107 is energized, by flux in the air gap between the lower plate 111 and the armature. This operates the lever 60 to open and close the switch. A cut-off switch 113, having a bridging contact 113a biased upwardly by a spring 108, and lower and upper contact members 113c and 113b may be connected, as shown, in circuit relation with the windings 106 and 107 by conductors 114—115, 116—117 and 118 to effect deenergization of the windings 106 and 107 in response to movement of the switch 17' to the open and closed positions, respectively. A hairpin spring lever 119 pivotally mounted on the pin 44 and actuated by the lever 46 may be disposed to actuate the bridging contact 113a down against the upward action of the spring 108. An enclosure 120 may be secured to an overhanging portion of casting 29 for mounting suitable control relays and the like for operating means 103.

In the normal or closed position of the linkage, as shown in Fig. 1, the link 46 is in toggle lock with respect to the operating handle 60. In other words, the pivotal point 59 of this toggle-linkage is some 3/32 of an inch below the line joining the two terminal pivots 61 and 45 of this toggle, so that weight or other opening bias of the movable contact member 20 tends to rock the rocker member 43 is a counterclockwise direction about its second terminal pivot-point 44, so that said rocker member presses the link 46 toward the operating handle 60 in such direction that most of the thrust is taken by the pivotal support 61 of the operating handle, but a small part of said thrust is transmitted to the abutment 62 for said operating handle, in the normal closed position of the mechanism. The weight or other biasing force of the movable contact member 20 is borne by the pivot 44, which is supported on the frame 41.

An electrical tripping-operation may be initiated by energizing the upper winding 106 through conductors 114, 115, contact members 113a and 113c, and conductor 118. Armature 104 moves upwardly, raising lever 60. This releases the toggle arrangement of levers 60 and 46, permitting lever 43 to rotate counterclockwise about pin 44, to drop pull rod 36 and open the switch. Spring lever 119 thereupon releases switch 113, to permit contact member 113a to separate from contact members 113c and engage upper contact members 113b. This deenergizes winding 106 and sets up an energizing circuit for the lower winding 107.

The switch 17' may be closed electrically by completing the energizing circuit for the operating winding 107 through conductors 116 and 118. The armature 104 is thereupon pulled downwardly. Lever 60 is moved clockwise and actuates lever 46 to effect clockwise rotation of lever 43 about pin 44. The pull rod 36 is raised, and the bridging contact 20 is drawn into engagement with stationary contacts 34 and 35. The toggle relation of levers 60 and 46 is restored, thus holding the switch 17' in the closed position. Lever 119 actuates switch 113 to the position shown, thus deenergizing winding 107 and setting up the energizing circuit for the winding 106.

If the contact 20 is opened by a manual opening movement of the operating handle 60, the first beginning of said movement elevates the inner pivot point 59 of the operating handle and breaks the toggle at this place, as in the electrical operation, after which the weight of the contact 20 causes the operating handle to continue to move into its fully open position. Manual reclosing is effected by restoring the handle 60 to the position shown, thus restoring the toggle relation.

In order to prevent either manual or automatic opening of the switch 17' during an overcurrent which is so excessive as to endanger operation of the switch, magnetic protective means 121 may be provided for preventing separation of the bridging contact 20 and stationary contacts, which are represented by the contact 34. The protective means 121 may comprise a solenoid coil 122 having an upper pole piece or plate 123 of magnetic material which extends above the upper leg 100 of the bracket 99 on the pull rod 36 and a lower pole piece or plate 124. The coil 122 may be connected in series circuit with the contacts 20 and 34 by conductors 32 and 32' in the manner of the counter coil 19 of Fig. 1, and it may likewise be supported by insulating supports 70 depending from the cover 29 of the switch. By making the bracket 99 of a magnetic material such as iron or steel, and connecting it to the lower end of the coil by means of pivoted guide links 94 of magnetic material, which may be secured to angle brackets 96 also of magnetic material secured to the lower pole piece 124 of the coil, a magnetic circuit will be provided for concentrating magnetic flux across the air gap 125 between the pole piece 123 and the upper leg 100 of the bracket 99. This flux will be effective to hold the bracket 99, pull rod 36 and bridging contact 20 in the closed position during an overcurrent of such magnitude as it would be dangerous to interrupt, even though the trip winding 106 were energized, or the handle 60 were manually moved from the overcenter position in which it is shown.

Referring to Fig. 5, it will be seen that a switch 17' embodying the features of my invention may be used to sectionalize a distribution line 6, which is supplied through a reclosing circuit breaker 8 from a source conductor 5.

The reclosing circuit breaker 8 may be of any well-known type, comprising for example, a movable contact 10 which is opened by an armature 11 in response to an overcurrent through a solenoid winding 12. A counter 13 operated upwardly in a step-by-step manner in response to successive openings of contact 10 actuates an overcenter toggle mechanism 14 after a predetermined number of operations, say four, of the armature 11, to lock the contact 10 open.

The switch 17' is of the type hereinbefore described, and has solenoid operating means 103 including trip and closing windings 106 and 107 for operating toggle lever 60 to release operating lever 43, and release pull rod 36 and bridging contact 20. Auxiliary switch 113 has contact 113a for effecting deenergization of windings 106 and 107. Protective means 120 prevents opening of contact 20 under excessive overcurrent.

Operation of switch 17' may be effected by a time delay relay 127 having an operating winding 127c for actuating an armature 127d. A double-acting dashpot 128 provides time delay in both directions for relay 127. The winding 127c may be energized from conductor 6 through a distribution or potential transformer 130, to provide for operating the relay to connect closing winding 107 for energization when the conductor 6 is energized. The relay 127 may, for example, be mounted in enclosure 120 of switch 17'.

With the system energized as shown, a fault on conductor 6a will result in reclosing circuit breaker 8 opening and reclosing contact 10 in an attempt to clear the fault. If the fault persists, the breaker 8 will open and reclose three times, and will then lock open the fourth time it opens.

The switch 17' will remain closed each time the breaker 8 opens, as the duration of opening of breaker 8 during its counting cycle is insufficient for relay 127 to open. When the breaker 8 locks open, relay 127 times out, and eventually drops to the deenergized position, in which a circuit is set up through contact 127a for energizing trip winding 106 when the conductor 6 is reenergized.

When the circuit breaker 8 is reclosed after such an outage, trip winding 106 is energized to open the switch 17' and permit the circuit breaker to pick up the load on conductor 6 only. If the fault remains on conductor 6a, the magnetic protective means 120 will hold contact 20 closed and prevent the switch from attempting to interrupt an excessive fault current which it may not be able to safely interrupt. In such case, circuit breaker 8 again opens and again goes through its cycle, locking open as hereinbefore described.

If the fault does not remain on conductor 6a, switch 17' opens with the restoration of voltage, and relay 127 starts to close. After a time delay, relay 127 closes contact 127a to complete an energizing circuit for closing winding 107 to close switch 17'. The load on conductor 6a will thus be picked up after that on conductor 6, and the effects of loss of load diversity due to the outage may thus be minimized.

While I have illustrated my invention in but two exemplary forms of embodiment, which are now preferred, I wish it to be understood that my invention is susceptible of considerable modification, by way of additions, omissions and the substitution of various equivalents, without departing from the essential spirit of my invention, particularly in its broader aspects.

I claim is my invention:

1. A circuit interrupter comprising, relatively movable contacts, insulating means for actuating one of said contacts, a member of magnetic material mounted on the insulating means and movable with the movable contact, a stationary member of magnetic material disposed in spaced relation with the movable member, a coil connected in series relation with said contact and having the stationary member as a pole piece, and guide means of a magnetic material for the movable contact pivotally connected to the movable member magnetically linking the coil and the movable member to provide a magnetic circuit including the stationary member, guide means and movable member.

2. In a circuit interrupter, a stationary contact, a movable contact, an insulating member actuating the movable contact, a member of magnetic material supported on the insulating member and movable with the movable contact, a stationary member of magnetic material disposed in predetermined spaced relation with the movable member in the direction of movement, a coil connected in circuit with the contacts having the stationary member as a pole piece at one end to produce a magnetic flux in the stationary magnetic member, and a link of magnetic material pivotally connecting the movable magnetic member to a point at the other end of the coil providing a low reluctance path for said flux between the coil and the movable magnetic member.

3. A circuit interrupter comprising, a pair of stationary contacts, a movable contact bridging said stationary contacts, a member of magnetic material movable with said movable contact and having a substantially plane surface disposed between the stationary contacts, a stationary member of magnetic material having a substantially plane surface disposed in substantially parallel spaced relation with the plane surface of the movable member, a coil connected in circuit with the contacts for producing a magnetic flux in the stationary member, and a pair of spaced guides of magnetic material pivotally connected to the movable member to provide a magnetic circuit between the coil and said movable member.

4. A circuit interrupter comprising, separable contacts, an operating mechanism for one of said contacts, a releasable latch normally supporting the operating mechanism in the closed position, an electromagnetic counter having an operating winding connected in series circuit with the contacts for effecting release of the latch after a predetermined number of overcurrent conditions to effect separation of said contacts, operating means operable to release said operating mechanism independently of said counter, a member of magnetic material movable with the operating mechanism, and means including a stationary member of magnetic material extending from one end of the operating winding to adjacent the movable member to provide an air gap therebetween for utilizing magnetic flux produced by the counter operating winding to prevent separation of the contacts during an excessive overcurrent.

5. A sectionalizing switch comprising, separable contacts, an operating mechanism for said contacts including an insulating pull rod and including a releasable latch for normally maintaining said contacts in a closed position, an electromagnetic counter having an operating winding connected in series with said contacts and a portion movable by magnetic flux produced by an overcurrent in said winding to release the latch after a predetermined number of closely successive overcurrents, additional means for actuating said operating mechanism to effect separation of said contacts, a member of magnetic material mounted on said pull rod, magnetic means coupling said member with the operating winding, and a stationary member of magnetic material extending from one end of the operating winding to adjacent the member on the rod to provide a magnetic circuit having an air gap to maintain the rod in the closed contact position during an overcurrent, said stationary member being magnetically coupled to the operating winding and movable magnetic member by magnetic flux from the operating winding.

6. In a sectionalizing switch, separable contacts; an operating mechanism for said contacts including a pull rod, a releasable latch and a toggle linkage for releasing the pull rod to separate said contacts; an electromagnetic counter having an operating winding connected in circuit with the contacts, said counter being operable to release the latch after a predetermined number of closely successive overcurrents; operating means operable to release the pull rod independently of said counter; a member of magnetic material mounted on the pull rod and having a portion substantially normal to the axis of the pull rod; a stationary member of magnetic material extending from one end of the operating winding in spaced relation axially of the pull rod with the normal portion of the magnetic member on the pull rod; and a link of magnetic material pivotally connected to the magnetic member of the pull rod and extending adjacent the other end of the winding, said members and link being magnetically coupled to the operating winding to use magnetic flux therefrom to attract the member on the pull rod to the stationary member and prevent separation of the contacts during an overcurrent.

7. A circuit interrupter comprising, a pair of stationary contacts, a movable bridging contact, a pull rod for supporting the bridging contact, a member of magnetic material supported on the pull rod and having a portion adjacent the bridging contact on the stationary contact side thereof, link means of magnetic material pivotally connected to said member, an additional member of magnetic mtaerial movably disposed on the opposite side of the bridging contact, a stationary member of magnetic material having a portion disposed on the opposite side of the member of magnetic material from the additional member of magnetic material, and means including a winding connected in series with the contacts having the stationary member as one pole piece and the link means as the other pole piece operable to produce a magnetic flux between the stationary magnetic member and the first-mentioned magnetic member on the pull rod to prevent movement of the pull rod to open the contacts during an overcurrent in excess of a value which may be safely interrupted.

8. In a circuit interrupter, separable contacts, an operating mechanism to actuate a movable one of said contacts including a movable insulating pull rod supporting the movable contact, an operating lever pivotally connected to the pull rod and having a toggle linkage for maintaining said lever in a contact closed position, an electromagnet having an armature operable to different positions to actuate the toggle linkage to open and close said contacts, a member of magnetic material supported on the pull rod and movable therewith, a stationary member of magnetic material disposed in spaced relation to the movable member axially of the pull rod, a winding connected in series circuit with the contacts and disposed to produce a magnetic flux in the stationary member, and a pair of guide links of magnetic material pivotally connected with the movable magnetic member and extending adjacent to the winding to provide a path for magnetic flux therebetween.

References Cited in the file of this patent

UNITED STATES PATENTS

| | | |
|---|---|---|
| 692,217 | Sundh | Jan. 28, 1902 |
| 909,813 | Murphy | Jan. 12, 1909 |
| 1,253,207 | Brown | Jan. 15, 1918 |
| 1,272,444 | Holliday | July 16, 1918 |
| 1,272,447 | Jacobs | July 16, 1918 |
| 1,443,583 | MacGahan | Jan. 30, 1923 |
| 1,669,106 | Tritte | May 8, 1928 |
| 1,684,249 | Stevenson | Sept. 11, 1928 |
| 1,718,448 | Zamazaki | June 25, 1929 |
| 1,795,198 | Connell | Mar. 3, 1931 |
| 2,023,098 | Parsons | Dec. 3, 1935 |
| 2,272,752 | Spurck | Feb. 10, 1942 |
| 2,333,604 | Wallace | Nov. 2, 1943 |
| 2,467,720 | Austin | Apr. 19, 1949 |
| 2,515,530 | Schindler | July 18, 1950 |
| 2,654,053 | Wallace et al. | Sept. 29, 1953 |
| 2,679,561 | Thompson | May 25, 1954 |
| 2,688,672 | Edwards | Sept. 7, 1954 |
| 2,701,828 | Edward et al. | Feb. 8, 1955 |